United States Patent
Yang

(10) Patent No.: US 7,944,721 B2
(45) Date of Patent: May 17, 2011

(54) SWITCHING CONTROL CIRCUIT FOR MULTI-CHANNELS AND MULTI-PHASES POWER CONVERTER OPERATED AT CONTINUOUS CURRENT MODE

(75) Inventor: Ta-Yung Yang, Taoyuan (TW)

(73) Assignee: System General Corp., Taipei Hsien (TW)

( * ) Notice: Subject to any disclaimer, the term of this patent is extended or adjusted under 35 U.S.C. 154(b) by 266 days.

(21) Appl. No.: 12/389,465

(22) Filed: Feb. 20, 2009

(65) Prior Publication Data
US 2009/0237133 A1    Sep. 24, 2009

(51) Int. Cl.
*H02J 1/10* (2006.01)
*G05F 1/40* (2006.01)

(52) U.S. Cl. .......................................... 363/72; 323/271

(58) Field of Classification Search ............ 363/65, 363/67, 69–72; 323/268, 271, 272, 282, 323/285
See application file for complete search history.

(56) References Cited

U.S. PATENT DOCUMENTS

| | | | | |
|---|---|---|---|---|
| 5,191,520 A | * | 3/1993 | Eckersley | 363/72 |
| 5,995,390 A | * | 11/1999 | Otake | 363/39 |
| 6,819,577 B1 | * | 11/2004 | Wiktor et al. | 363/72 |

* cited by examiner

Primary Examiner — Matthew V Nguyen
(74) Attorney, Agent, or Firm — Ming Chow; Sinorica, LLC

(57) ABSTRACT

A switching control circuit for multi-channels and multi-phases power converter according to the present invention comprises a master control circuit and a slave control circuit. The master control circuit generates a multiplier signal in response to an input voltage and an output voltage of the power converter, and generates a first switching signal to switch a first inductor of the power converter in accordance with the multiplier signal and the first-current signal generated by a first current-sense device. The slave control circuit generates a second switching signal to switch a second inductor of the power converter in accordance with the multiplier signal, the first switching signal and a second-current signal generated by a second current-sense device. Once the power converter is at light-load, the multiplier signal is disabled to turn off the second switching signal to turn off the slave control circuit for power saving of the power converter.

26 Claims, 10 Drawing Sheets

SWITCHING CONTROL CIRCUIT FOR MULTI-CHANNELS AND MULTI-PHASES POWER CONVERTER OPERATED AT CONTINUOUS CURRENT MODE

BACKGROUND OF THE INVENTION

1. Filed of Invention

The present invention relates to power converters, and more particularly, to the switching control circuit of power converters.

2. Description of Related Art

The high current demand normally decreases the power efficiency in the power converter. The power loss of the power converter is exponentially proportional to its current.

$$P_{LOSS} = I^2 \times R \quad (1)$$

where I is a switching current of the power converter, R is the impedance of the switching devices such as the equivalent resistance of the inductor and the transistor, etc.

Therefore, parallel technologies are developed for reducing the power consumption of power converter. The PFC (power factor correction) power converter is utilized to improve the power factor of AC power source. The detail skill of the PFC circuit can be found in prior arts, such as U.S. Pat. No. 7,116,090 "Switching control circuit for discontinuous mode PFC converters".

SUMMARY OF THE INVENTION

The present invention provides a switching control circuit for multi-channels and multi-phases power converter operated at continuous current mode (CCM) to improve the efficiency of the power converter. Multi-phases technologies including synchronization and phase shift are designed to spread the switching noise and reduce the current ripple. The switching control circuit according to the present invention comprises a master control circuit and a slave control circuit. The master control circuit generates a multiplier signal in response to an input voltage and an output voltage of the power converter, and generates a first switching signal to switch a first inductor of the power converter in accordance with the multiplier signal and the first-current signal generated by a first current-sense device. The slave control circuit generates a second switching signal to switch a second inductor of the power converter in accordance with the multiplier signal, the first switching signal and a second-current signal generated by a second current-sense device. Once the power converter is at light-load, the multiplier signal is disabled to turn off the second switching signal to turn off the slave control circuit for power saving of the power converter.

BRIEF DESCRIPTION OF DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF PREFERRED EMBODIMENTS

Figure 1:
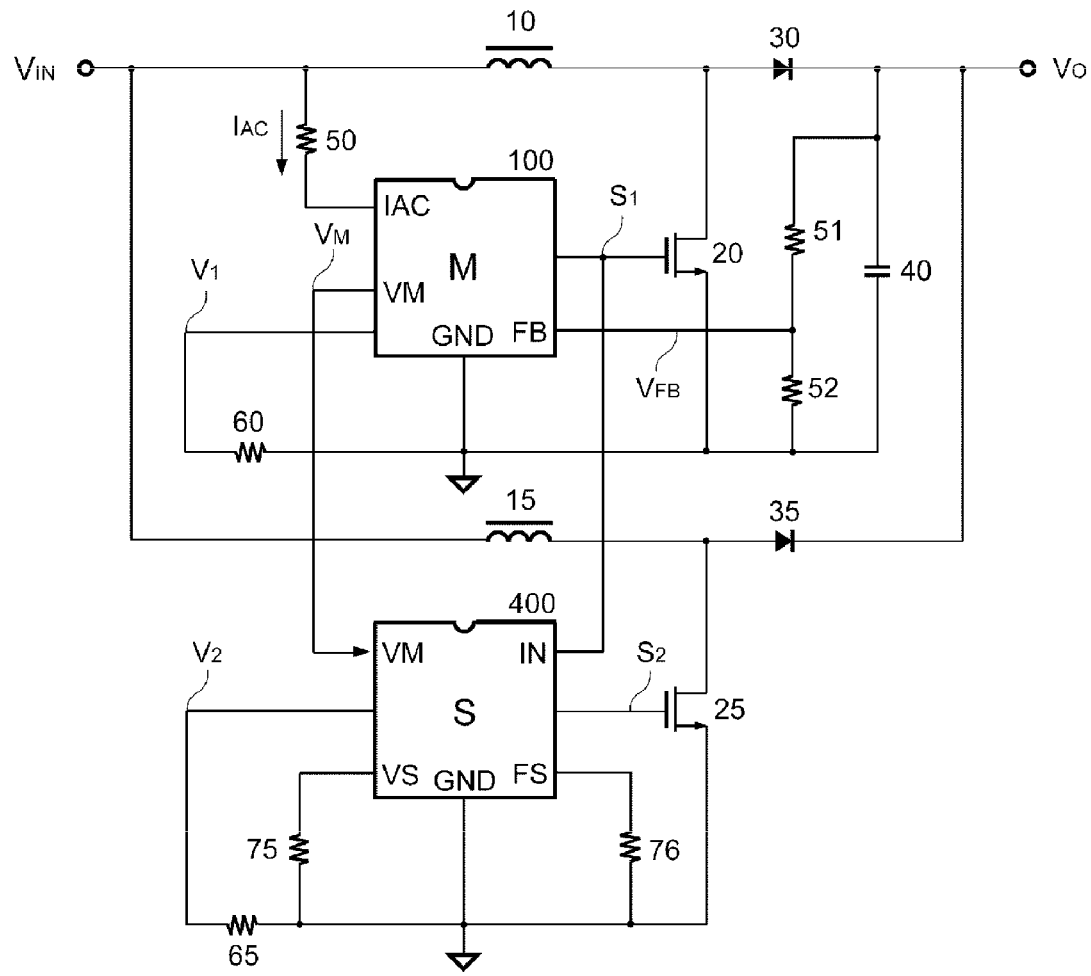
FIG. 1 is a circuit schematic illustrating one embodiment of a multi-channels and multi-phases PFC power converter according to the present invention.

FIG. 1 shows a circuit schematic illustrating one embodiment of a multi-channels and multi-phases power converter according to the present invention. As shown, the power converter includes a master control circuit (M) 100 and a slave control circuit (S) 400. The master control circuit 100 generates a first switching signal S1 coupled to a first power switch 20 for switching a first inductor 10 for power factor correction (PFC). The first inductor 10 is operated for the first PFC channel. An input terminal of the first inductor 10 is coupled to an input voltage $V_{IN}$. An output terminal of the first inductor 10 is coupled to an output voltage $V_O$ of the power converter through a diode 30. A filter capacitor 40 is coupled between an output terminal of the power converter and a ground to filter the output voltage $V_O$. The slave control circuit 400 generates a second switching signal $S_2$ coupled to a second power switch 25 for switching a second inductor 15. The second inductor 15 is operated for the second PFC channel. An input terminal of the second inductor 15 is also coupled to the input voltage $V_{IN}$. An output terminal of the second inductor 15 is also coupled to the output voltage $V_O$ via a diode 35 to share the output current with the first PFC channel.

The master control circuit 100 is coupled to an input terminal of the power converter to receive a line-input signal $I_{AC}$ via an input resistor 50, and coupled to an output terminal of the power converter to receive a feedback signal $V_{FB}$ via a voltage divider formed by a resistor 51 and a resistor 52. The line-input signal $I_{AC}$ and the feedback signal $V_{FB}$ are correlated to the input voltage $V_{IN}$ and the output voltage $V_O$ of the power converter respectively. The resistors 51 and 52 are connected in series and coupled from the output terminal to the ground. A feedback terminal FB of the master control circuit 100 is coupled to the voltage divider to receive the feedback signal $V_{FB}$. An input terminal IAC of the master control circuit 100 is coupled to the input voltage $V_{IN}$ to receive the line-input signal $I_{AC}$ through the input resistor 50. A multiplier signal $V_M$ is generated at an output terminal VM of the master control circuit 100 in accordance with the line-input signal $I_{AC}$ and the feedback signal $V_{FB}$. It means that the multiplier signal $V_M$ is generated in accordance with the input voltage $V_{IN}$ and the output voltage $V_O$ of the power converter. The master control circuit 100 is also coupled to a first current-sense device 60 for receiving a first-current signal $V_1$ generated by the first current-sense device 60 in response to a switching current of the first inductor 10. The first current-sense device 60 can be a resistor according to one embodiment of the present invention. The master control circuit 100 generates the first switching signal $S_1$ to switch the first inductor 10 in accordance with the multiplier signal $V_M$ and the first-current signal $V_1$.

As shown in FIG. 1, the slave control circuit 400 is coupled to the master control circuit 100 for receiving the multiplier signal $V_M$ and the first switching signal $S_1$. An input terminal VM of the slave control circuit 400 is coupled to the output terminal VM of the master control circuit 100 to receive the multiplier signal $V_M$. An input terminal IN of the slave control circuit 400 is coupled to the master control circuit 100 to receive the first switching signal $S_1$. The slave control circuit 400 is also coupled to a second current-sense device 65 for receiving a second-current signal $V_2$ generated by the second current-sense device 65 in response to a switching current of the second inductor 15. The second current-sense device 65 can be a resistor according to one embodiment of the present invention.

The slave control circuit 400 generates the second switching signal $S_2$ to switch the second inductor 15 in accordance with the multiplier signal $V_M$, the first switching signal $S_1$ and the second-current signal $V_2$. The second switching signal $S_2$ is synchronized with the first switching signal $S_1$. The first switching signal $S_1$ is operated at the first phase. The second switching signal $S_2$ is operated at the second phase. A programmable device such as a resistor 75 is connected to an output terminal VS of the slave control circuit 400 to determine the delay time for phase shift between the first switching signal $S_1$ and the second switching signal $S_2$ that can spread the switching noise of the first switching signal $S_1$ and the second switching signal $S_2$. A resistor 76 is coupled to an output terminal FS of the slave control circuit 400.

Figure 2:
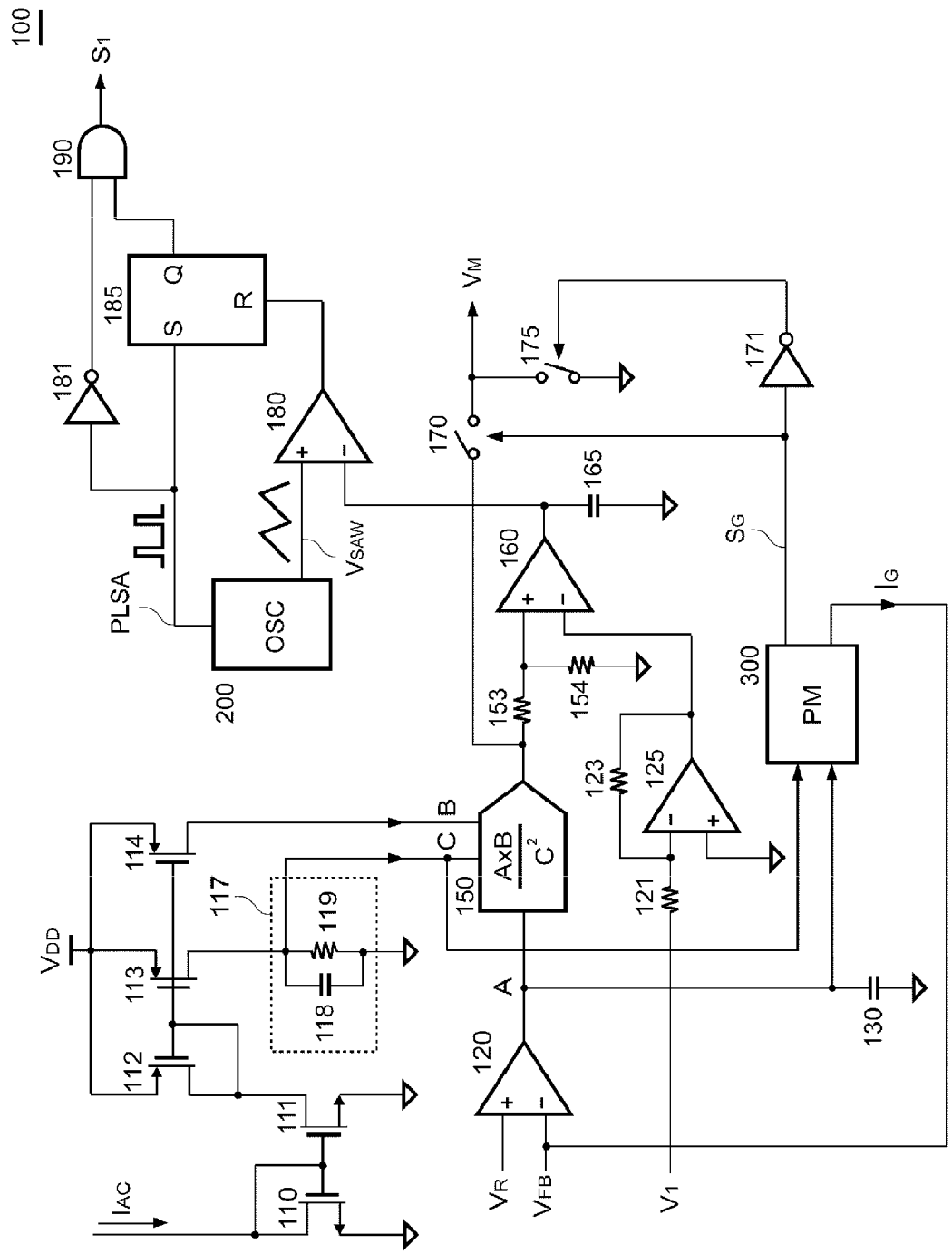
FIG. 2 is a circuit schematic illustrating one embodiment of the master control circuit according to the present invention.

FIG. 2 shows a circuit schematic illustrating one embodiment of the master control circuit 100 according to the present invention. As shown, the master control circuit 100 includes a multiplier-divider circuit 150 and a power management circuit (PM) 300. A negative input of a voltage amplifier 120 receives the feedback signal $V_{FB}$, a reference signal $V_R$ is supplied to a positive input of the voltage amplifier 120. A voltage compensator is coupled between an output of the voltage amplifier 120 and the ground. The voltage compensator can be a capacitor 130 according to an embodiment of the present invention. The output of the voltage amplifier 120 generates a signal A. The signal A is correlated to the feedback signal $V_{FB}$. The line-input signal $I_{AC}$ correlated to the input voltage $V_{IN}$ generates a signal B through a plurality of current mirrors formed by a plurality of transistors 110, 111, 112, 113 and 114. A current mirror includes the transistors 110 and 111. A drain of the transistor 110 is coupled to the line-input signal $I_{AC}$ and connected to gates of the transistors 110 and 111. Sources of the transistors 110 and 111 are coupled to the ground. A current mirror includes the transistors 112 and 113. Sources of the transistors 112 and 113 are coupled to a supply voltage $V_{DD}$. A drain of the transistor 112 is coupled to a drain of the transistor 111, and the drain of the transistor 112 is further coupled to gates of the transistors 112 and 113. A current mirror includes the transistors 112 and 114. A source of the transistor 114 is also coupled to the supply voltage $V_{DD}$, and a gate of the transistor 114 is coupled to the gate of the transistor 112. A drain of the transistor 114 generates the signal B.

A signal C is generated by the line-input signal $I_{AC}$ through a filter 117 formed by a capacitor 118 and a resistor 119. The capacitor 118 and the resistor 119 are connected in parallel and coupled between the drain of the transistor 113 and the ground. The signal C is a DC voltage correlated to the line-input signal $I_{AC}$. Three signals A, B and C are supplied to inputs of the multiplier-divider circuit 150. An output of the multiplier-divider circuit 150 is coupled to a positive input of a current amplifier 160 through an attenuator formed by a resistor 153 and a resistor 154. The resistors 153 and 154 are connected in series and coupled between the output of the multiplier-divider circuit 150 and the ground. A negative input of the current amplifier 160 receives the first-current signal $V_1$ through an inverter amplifier formed by an amplifier 125 and two resistors 121 and 123. The resistor 121 is coupled to a negative input of the amplifier 125, and the negative input of the amplifier 125 receives the first-current signal $V_1$ through the resistor 121. A positive input of the amplifier 125 is coupled to the ground. The resistor 123 is coupled between the negative input of the amplifier 125 and an output of the amplifier 125. The output of the amplifier 125 is coupled to the negative input of the current amplifier 160. A current compensator is coupled between an output of the current amplifier 160 and the ground. The current compensator can be a capacitor 165 according to an embodiment of the present invention. The multiplier-divider circuit 150 generates the multiplier signal $V_M$ in accordance with three signals A, B and C. The skill of generating the multiplier signal $V_M$ has been disclosed in a prior art of "Switched charge multiplier-divider" by Yang, et al., U.S. Pat. 6,812,769.

As shown in FIG. 2, two inputs of the power management circuit 300 receive signals A and C respectively. The signal A is correlated to the feedback signal $V_{FB}$, the signal C is correlated to the line-input signal $I_{AC}$. The power management circuit 300 generates a control signal $S_G$ and a current signal $I_G$ in accordance with signals A and C. The current signal $I_G$ is coupled to the feedback signal $V_{FB}$. One terminal of a switch 170 is coupled to the output of the multiplier-divider circuit 150. Another terminal of the switch 170 outputs the multiplier signal $V_M$. One terminal of a switch 175 receives the multiplier signal $V_M$. Another terminal of the switch 175 is coupled to the ground. An input of an inverter 171 is coupled to an output of the power management circuit 300 for receiving the control signal $S_G$. The control signal $S_G$ is used to turn on or turn off the switch 170. The control signal $S_G$ is also used to turn on or turn off the switch 175 through the inverter 171. The multiplier signal $V_M$ is enabled once the control signal $S_G$ is at a high-level and the switch 170 is turned on and the switch 175 is turned off. The multiplier signal $V_M$ is disabled once the control signal $S_G$ is at a low-level and the switch 170 is turned off and the switch 175 is turned on.

As illustrated in FIG. 2, the master control circuit 100 further comprises an oscillator (OSC) 200 and a PWM circuit. The oscillator 200 generates a first pulse signal PLSA and a saw-tooth signal $V_{SAW}$. The PWM circuit includes a comparator 180, an inverter 181, a RS flip-flop 185 and an AND gate 190. The saw-tooth signal $V_{SAW}$ is supplied to a positive input of the comparator 180. A negative input of the comparator 180 is coupled to the output of the current amplifier 160 for receiving an error signal correlated to the multiplier signal $V_M$ and the first-current signal $V_1$. A set input S of the RS flip-flop 185 is coupled to the oscillator 200 for receiving the first pulse signal PLSA. A reset input R of the RS flip-flop 185 is coupled to an output of the comparator 180. The comparator 180 compares the saw-tooth signal $V_{SAW}$ with the error signal to reset the RS flip-flop 185 once the saw-tooth signal $V_{SAW}$ is higher than the error signal. A first terminal of the AND gate 190 receives the first pulse signal PLSA through the inverter 181 to generate a maximum duty-cycle. A second terminal of the AND gate 190 is coupled to an output Q of the RS flip-flop 185. An output of the AND gate generates the first switching signal $S_1$. According to the description above, the PWM circuit generates the first switching signal $S_1$ in response to the multiplier signal $V_M$, the first-current signal $V_1$, the first pulse signal PLSA and the saw-tooth signal $V_{SAW}$.

Figure 3:
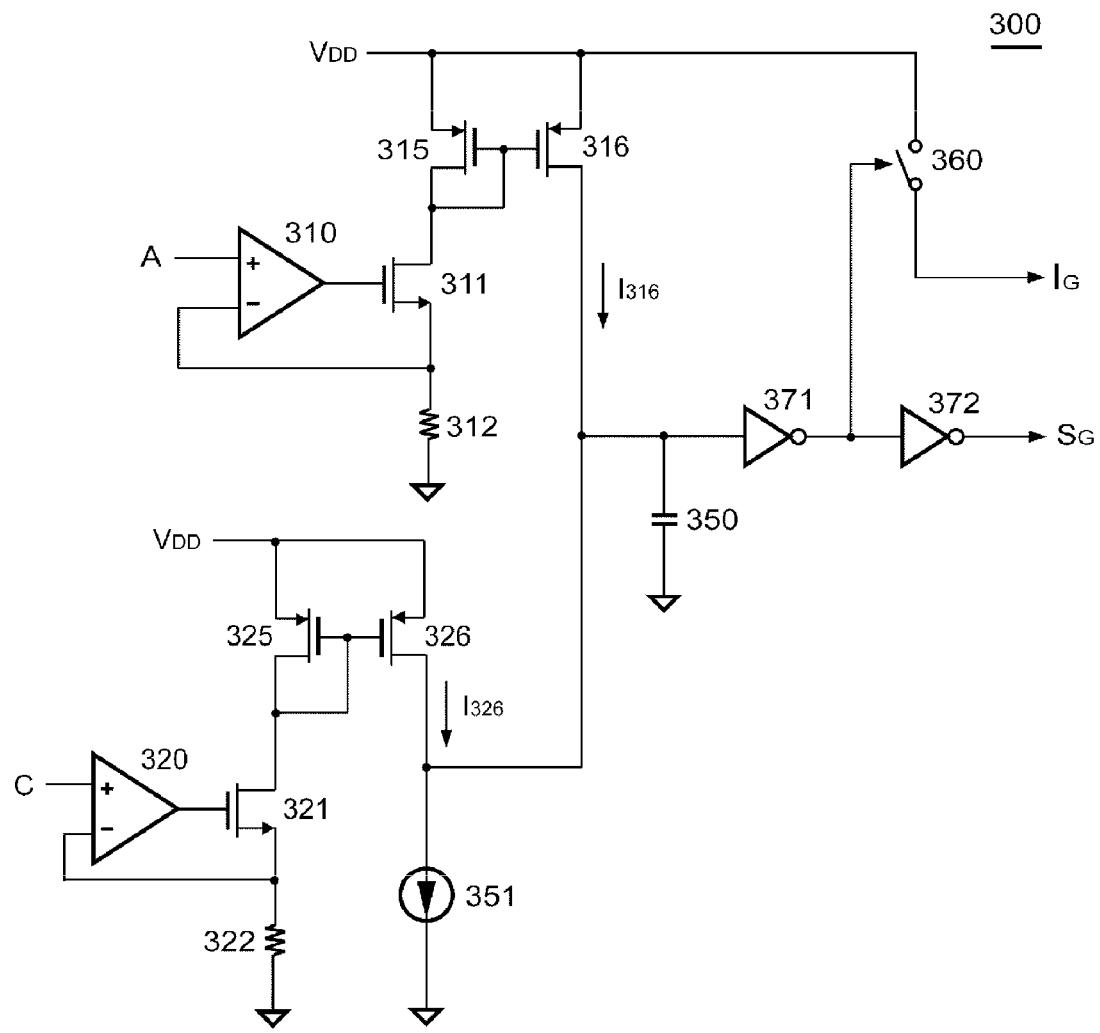
FIG. 3 is a circuit schematic illustrating one embodiment of the power management circuit according to the present invention.

FIG. 3 shows a circuit schematic illustrating one embodiment of the power management circuit 300 according to the present invention. The signal A correlated to the feedback signal $V_{FB}$ generates a current $I_{316}$ at a drain of a transistor 316 through a first V-to-I converter. The first V-to-I converter comprises an amplifier 310, a transistor 311, a resistor 312 and a first current mirror formed by a transistor 315 and the transistor 316. A positive input of the amplifier 310 receives the signal A. An output of the amplifier 310 is coupled to a gate of the transistor 311, and a negative input of the amplifier 310 is coupled to a source of the transistor 311. The resistor 312 is coupled from the source of the transistor 311 to the ground. A drain of the transistor 311 is coupled to a drain of the transistor 315 and gates of the transistors 315 and 316. Sources of the transistors 315 and 316 are coupled to the supply voltage $V_{DD}$. The drain of the transistor 316 generates the current $I_{316}$.

The signal C correlated to the line-input signal $I_{AC}$ generates a current $I_{326}$ at a drain of a transistor 326 through a second V-to-I converter. The second V-to-I converter comprises an amplifier 320, a transistor 321, a resistor 322 and a second current mirror formed by a transistor 325 and the transistor 326. A positive input of the amplifier 320 receives the signal C. An output of the amplifier 320 is coupled to a gate of the transistor 321, and a source of the transistor 321 is coupled to a negative input of the amplifier 320. The resistor 322 is coupled from the source of the transistor 321 to the ground. A drain of the transistor 321 is coupled to a drain of the transistor 325 and gates of the transistors 325 and 326. Sources of the transistors 325 and 326 are coupled to the supply voltage $V_{DD}$. The drain of the transistor 326 generates the current $I_{326}$.

A current source 351 is coupled from the drain of the transistor 326 to the ground. The current source 351 and the current $I_{326}$ develop a light-load threshold for light-load condition. A first terminal of a capacitor 350 is coupled to the drains of the transistors 316 and 326. A second terminal of the capacitor 350 is couple to the ground. An input of an inverter 371 is coupled to the first terminal of the capacitor 350, and an output of the inverter 371 is used to turn on or turn off a switch 360 for enabling or disabling the current signal $I_G$. A first terminal of the switch 360 is coupled to the supply voltage $V_{DD}$, and a second terminal of the switch 360 generates the current signal $I_G$. An input of an inverter 372 is coupled to the output of the inverter 371, and an output of the inverter 372 generates the control signal $S_G$.

The power management circuit 300 will generate the control signal $S_G$ to turn off the multiplier signal $V_M$ when the current $I_{316}$ is lower than the light-load threshold. As shown in FIG. 2, the power management circuit 300 is used to enable or disable the multiplier signal $V_M$ in response to the amplitude of the feedback signal $V_{FB}$. The multiplier signal $V_M$ is disabled when the feedback signal $V_{FB}$ is lower than the light-load threshold. The power management circuit 300 further controls the on-status or off-status of the multiplier signal $V_M$ in response to the line-input signal $I_{AC}$. As the input voltage $V_{IN}$ increases, the increase of the line-input signal $I_{AC}$ will increase the current $I_{326}$ and decrease the level of the light-load threshold. Furthermore, the power management circuit 300 will generate the current signal $I_G$ coupled to the feedback signal $V_{FB}$ when the control signal $S_G$ is at a low-level and the multiplier signal $V_M$ is disabled. The current signal $I_G$ will produce a hysteresis effect for turning on/off the multiplier signal $V_M$.

Referring to FIG. 1 and FIG. 2, the output voltage $V_O$ of the power converter can be expressed as, $$V_O = \frac{R_{51} + R_{52}}{R_{52}} \times V_R \quad (1)$$

$$V_O = \left\{ \frac{R_{51} + R_{52}}{R_{52}} \times \left[ V_R - \left( I_G \times \frac{R_{51} \times R_{52}}{R_{51} + R_{52}} \right) \right] \right\} \quad (2)$$

where $R_{51}$ and $R_{52}$ are resistance of the voltage divider formed by the resistor 51 and the resistor 52; $V_R$ is the reference signal of the voltage amplifier 120.

The equation (1) shows the value of the output voltage $V_O$ when the current signal $I_G$ is disabled and the control signal $S_G$ is at a high-level. At this condition, the feedback signal $V_{FB}$ is higher than the light-load threshold and the multiplier signal $V_M$ is enabled. The equation (2) shows the value of the output voltage $V_O$ when the current signal $I_G$ is enabled and the control signal $S_G$ is at the low-level. At this condition, the feedback signal $V_{FB}$ is lower than the light-load threshold and the multiplier signal $V_M$ is disabled. In general, the output voltage $V_O$ will increase and an over-voltage might be occurred when the output of the power converter is in the light-load condition. According to the present invention, the output voltage $V_O$ will reduce to achieve an over-voltage protection when the multiplier signal $V_M$ is disabled. The output voltage $V_O$ is determined by the ratio and the equivalent resistance of the voltage divider formed by the resistor 51 and the resistor 52.

Figure 4:
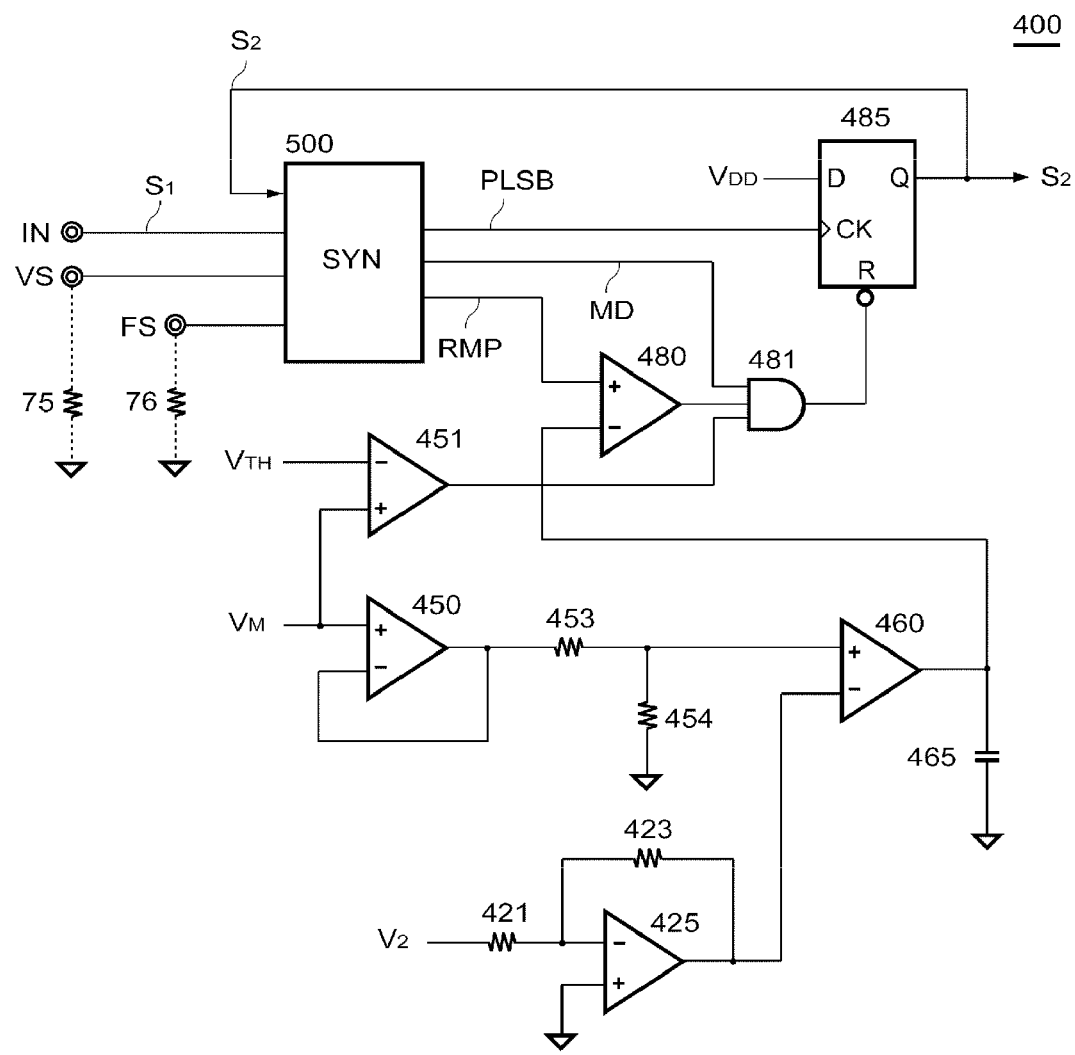
FIG. 4 is a circuit schematic illustrating one embodiment of the slave control circuit according to the present invention.

FIG. 4 shows a circuit schematic illustrating one embodiment of the slave control circuit 400 according to the present invention. The slave control circuit 400 includes a synchronous circuit 500, a current control unit, a PWM circuit and an under-voltage comparator 451. The synchronous circuit 500 is coupled to the resistors 75 and 76 (as shown in FIG. 1) through the output terminals VS and FS respectively. The synchronous circuit 500 receives the first switching signal $S_1$ through the input terminal IN. The synchronous circuit 500 generates a second pulse signal PLSB, a maximum-duty signal MD and a ramp signal RMP in accordance with the first switching signal $S_1$ and the second switching signal $S_2$. The current control unit includes an inverter amplifier, a buffer 450, an attenuator, a current amplifier 460 and a current compensator. A negative input of the current amplifier 460 receives the second-current signal $V_2$ through the inverter amplifier formed by an amplifier 425 and two resistors 421 and 423. A positive input of the current amplifier 460 receives the multiplier signal $V_M$ through the buffer 450 and the attenuator formed by two resistors 453 and 454. An output of the current amplifier 460 generates an error signal in response to the second-current signal $V_2$ and the multiplier signal $V_M$. The current compensator is coupled between an output of the current amplifier 460 and the ground. The current compensator can be a capacitor 465 according to an embodiment of the present invention.

The resistor 421 is coupled to a negative input of the amplifier 425, and the negative input of the amplifier 425 receives the second-current signal $V_2$ through the resistor 421. A positive input of the amplifier 425 is coupled to the ground. The resistor 423 is coupled between the negative input of the amplifier 425 and an output of the amplifier 425. The output of the amplifier 425 is coupled to the negative input of the current amplifier 460. The resistors 453 and 454 are coupled in series and coupled from an output of the buffer 450 to the ground. A joint of the resistors 453 and 454 is coupled to the positive input of the current amplifier 460. A positive input of the buffer 450 receives the multiplier signal $V_M$, and a negative input of the buffer 450 is coupled to the output of the buffer 450. The PWM circuit includes a comparator 480, an AND gate 481 and a D flip-flop 485. A clock input CK of the D flip-flop 485 receives the second pulse signal PLSB. The supply voltage $V_{DD}$ is supplied to an input D of the D flip-flop 485. A reset input R of the D flip-flop 485 is coupled to an output of the AND gate 481. An output Q of the D flip-flop 485 outputs the second switching signal $S_2$. A first input of the AND gate 481 receives the maximum-duty signal MD to determine a maximum duty-cycle of the second switching signal $S_2$. A positive input of the comparator 480 receives the ramp signal RMP. A negative input of the comparator 480 is coupled to the current amplifier 460 for receiving the error signal correlated to the multiplier signal $V_M$ and the second-current signal $V_2$. A second input of the AND gate 481 is coupled to an output of the comparator 480. The comparator 480 compares the ramp signal RMP with the error signal to reset the D flip-flop 485 to determine a pulse-width of the second switching signal $S_2$ once the ramp signal RMP is lower than the error signal. A positive input of the under-voltage comparator 451 receives the multiplier signal $V_M$. An under-voltage threshold $V_{TH}$ is supplied to a negative input of the under-voltage comparator 451. A third input of the AND gate 481 is coupled to an output of the under-voltage comparator 451. The under-voltage comparator 451 compares the multiplier signal $V_M$ with the under-voltage threshold $V_{TH}$ to reset the D flip-flop 485 for limiting the pulse-width of the second switching signal $S_2$ once the multiplier signal $V_M$ is lower than the under-voltage threshold $V_{TH}$. In addition, when the multiplier signal $V_M$ is disabled, the second switching signal $S_2$ will be switched off to turn off the slave control circuit 400 for power saving of the power converter. Referring to FIG. 1 and FIG. 2, the hysteresis of turning on/off the multiplier signal $V_M$ and decrease of the output voltage $V_O$ can be programmed by the equivalent resistance of the voltage divider formed by the resistor 51 and the resistor 52.

Figure 5:
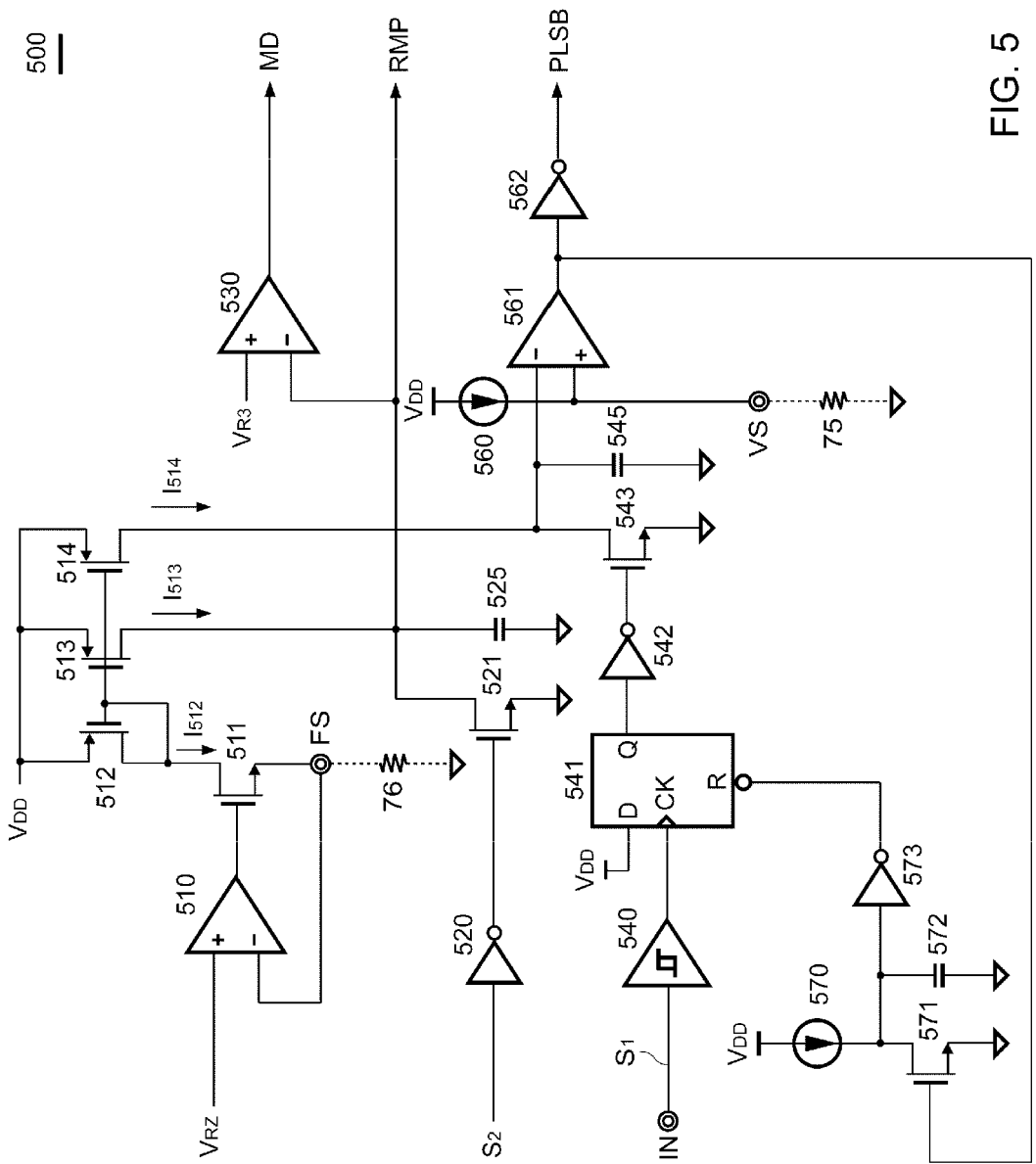
FIG. 5 is a circuit schematic illustrating one embodiment of the synchronous circuit according to the present invention.

FIG. 5 shows a circuit schematic illustrating one embodiment of the synchronous circuit 500 according to the present invention. The synchronous circuit 500 includes a ramp generator, a maximum-duty comparator 530 and a pulse generator. The ramp generator includes a V-to-I converter, a current mirror, an inverter 520, a transistor 521 and a capacitor 525. A reference voltage $V_{RZ}$ is supplied to the V-to-I converter formed by an amplifier 510 and a transistor 511 to get a current $I_{512}$ at a drain of the transistor 511 through the output terminal FS of the slave control circuit 400 and the resistor 76. The amplitude of the current $I_{512}$ is determined by the resistor 76. The reference voltage $V_{RZ}$ is supplied to a positive input of the amplifier 510. A negative input of the amplifier 510 is coupled to a source of the transistor 511. An output of the amplifier 510 is coupled to a gate of the transistor 511. The source of the transistor 511 is further coupled to the output terminal FS to connected the resistor 76. The drain of the transistor 511 generates the current $I_{512}$.

The current mirror formed by transistors 512 and 513 generates a current $I_{513}$ at a drain of the transistor 513 in response to the current $I_{512}$. A drain of the transistor 512 is coupled to the drain of the transistor 511 and gates of the transistors 512 and 513. Sources of the transistors 512 and 513 are coupled to the supply voltage $V_{DD}$. The drain of the transistor 513 generates the current $I_{513}$. A gate of the transistor 521 receives the second switching signal S2 through the inverter 520. A drain of the transistor 521 is coupled to the current mirror to receive the current $I_{513}$. The current $I_{513}$ is correlated to the current $I_{512}$. A source of the transistor 521 is coupled to the ground. The capacitor 525 is coupled between the drain and the source of the transistor 521. The capacitor 525 is charged by the current $I_{513}$ and discharged through the transistor 521 once the second switching signal $S_2$ is switched off. The ramp signal RMP is generated at the capacitor 525 in response to the second switching signal $S_2$. Through the output terminal FS of the slave control circuit 400, a slope of the ramp signal RMP can be programmed by the resistor 76. A reference signal $V_{R3}$ is supplied to a positive input of the maximum-duty comparator 530, a negative input of the maximum-duty comparator 530 receives the ramp signal RMP. An output of the maximum-duty comparator 530 generates the maximum-duty signal MD to determine the maximum duty-cycle of the second switching signal $S_2$.

As illustrated in FIG. 5, the pulse generator includes a hysteresis buffer 540, a D flip-flop 541, a reset circuit, an inverter 542, a transistor 543, a current mirror, a capacitor 545, a current source 560, a comparator 561 and an inverter 562. A clock input CK of the D flip-flop 541 receives the first switching signal SI through the hysteresis buffer 540. The supply voltage $V_{DD}$ is supplied to an input D of the D flip-flop 541. A reset input R of the D flip-flop 541 is couple to the reset circuit to rest the D flip-flop 541. The current mirror formed by transistors 512 and 514 generates a current $I_{514}$ at a drain of the transistor 514 in response to the current $I_{512}$. A gate of the transistor 514 is coupled to the gate of the transistor 512, and the source of the transistor 514 is coupled to the supply voltage $V_{DD}$. A gate of the transistor 543 is coupled to an output Q of the D flip-flop 541 through the inverter 542. A drain of the transistor 543 is coupled to the drain of the transistor 514 for receiving the current $I_{514}$. The current $I_{514}$ is correlated to the current $I_{512}$. A source of the transistor 543 is coupled to the ground. The capacitor 545 is coupled between the drain and the source of the transistor 543. The capacitor 545 is charged by the current $I_{514}$ and discharged through the transistor 543 once the output Q of the D flip-flop 541 is disabled. A negative input of the comparator 561 is coupled to the drain of the transistor 543 and the capacitor 545. A positive input of the comparator 561 is coupled to the supply voltage $V_{DD}$ through the current source 560. Through the output terminal VS of the slave control circuit 400, the programmable device such as the resistor 75 is used to determine a delay time for phase shift between the first switching signal $S_1$ and the second switching signal $S_2$.

The reset circuit includes a current source 570, a transistor 571, a capacitor 572 and an inverter 573. The reset circuit is coupled to an output of the comparator 561 to reset the output Q of the D flip-flop 541 when a signal at the capacitor 545 is larger than a signal at the output terminal VS. A gate of the transistor 571 is coupled to the output of the comparator 561, and a source of the transistor 571 is coupled to the ground. A drain of the transistor 571 is coupled to the supply voltage $V_{DD}$ through the current source 570. The capacitor 572 is coupled between the drain and the source of the transistor 571. An input of the inverter 573 is coupled to the drain of the transistor 571 and the capacitor 572, and an output of the inverter 573 is used to reset the output Q of the D flip-flop 541.

An input of the inverter 562 is coupled to the output of the comparator 561 and the reset circuit. The second pulse signal PLSB is generated at an output of the inverter 562. The delay time for phase shift between the first switching signal $S_1$ and the second switching signal $S_2$ is generated in response to the current $I_{514}$ and the capacitor 545. A pulse-width of the second pulse signal PLSB is determined by the current source 570 and the capacitor 572. However, the synchronous circuit 500 generates the second pulse signal PLSB in accordance with the first switching signal $S_1$. The synchronous circuit 500 generates the maximum-duty signal MD in accordance with the second switching signal $S_2$. The second pulse signal PLSB is used to enable the second switching signal $S_2$. The maximum-duty signal MD is used to disable the second switching signal $S_2$ and determine the maximum duty-cycle of the second switching signal $S_2$. The ramp signal RMP associates with the multiplier signal $V_M$ and the second-current signal $V_2$ determines the pulse-width of the second switching signal $S_2$.

Figure 6:
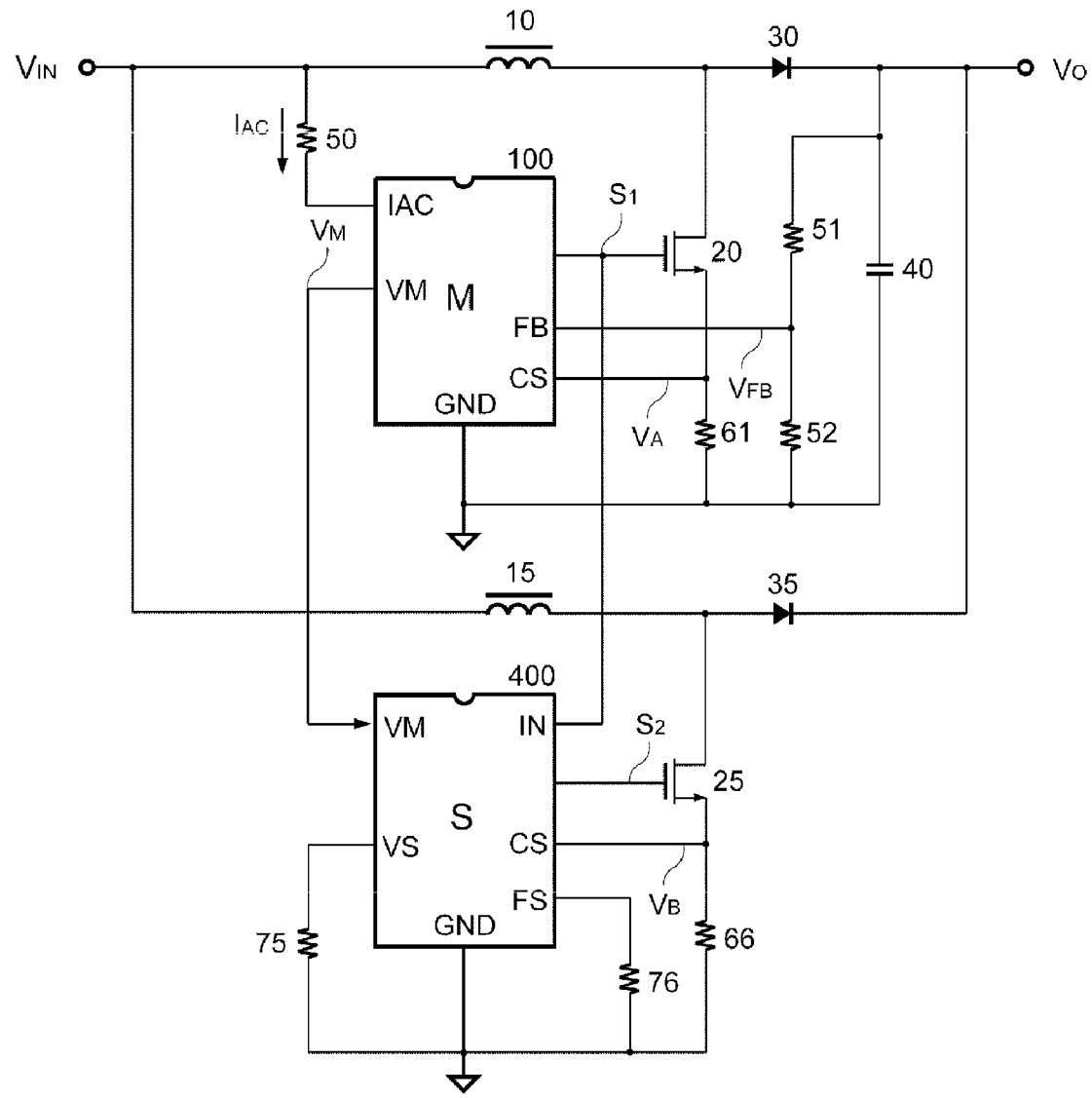
FIG. 6 is a circuit diagram illustrating another embodiment of the multi-channels and multi-phases PFC power converter according to the present invention.

FIG. 6 shows a circuit schematic illustrating another embodiment of the multi-channels and multi-phases power converter according to the present invention. The master control circuit 100 generates the first switching signal SI coupled to the first power switch 20 for switching the first inductor 10 for power factor correction (PFC). The slave control circuit 400 generates the second switching signal $S_2$ coupled to the second power switch 25 for switching the second inductor 15. Most of the circuits of the master control circuit 100 and the slave control circuit 400 of this embodiment are the same as the first embodiment (as shown in FIG. 1) and no more description here, the main difference compared to the first embodiment is that the master control circuit 100 and the slave control circuit 400 of this embodiment further includes an input terminal CS respectively. Further, the master control circuit 100 of this embodiment is not coupled to the first-current sense device 60 (as shown in FIGS. 1), and the slave control circuit 400 of this embodiment is not coupled to the second-current sense device 65 (as shown in FIG. 1). The input terminal CS of the master control circuit 100 is coupled to a first current-sense device 61 for receiving a first-current signal $V_A$ generated by the first current-sense device 61 in response to a switching current of the first power switch 20. The first power switch 20 is coupled to the master control circuit 100 and the first inductor 10 to switch the first inductor 10. The first current-sense device 61 is coupled from the first power switch 20 to the ground. The input terminal CS of the slave control circuit 400 is coupled to a second current-sense device 66 for receiving a second-current signal $V_B$ generated by the second current-sense device 66 in response to a switching current of the second power switch 25. The second power switch 25 is coupled to the salve control circuit 400 and the second inductor 15 to switch the second inductor 15. The second current-sense device 66 is coupled from the second power switch 25 to the ground. The first current-sense device 61 and the second current-sense device 66 can be resistors according to one embodiment of the present invention.

Figure 7:
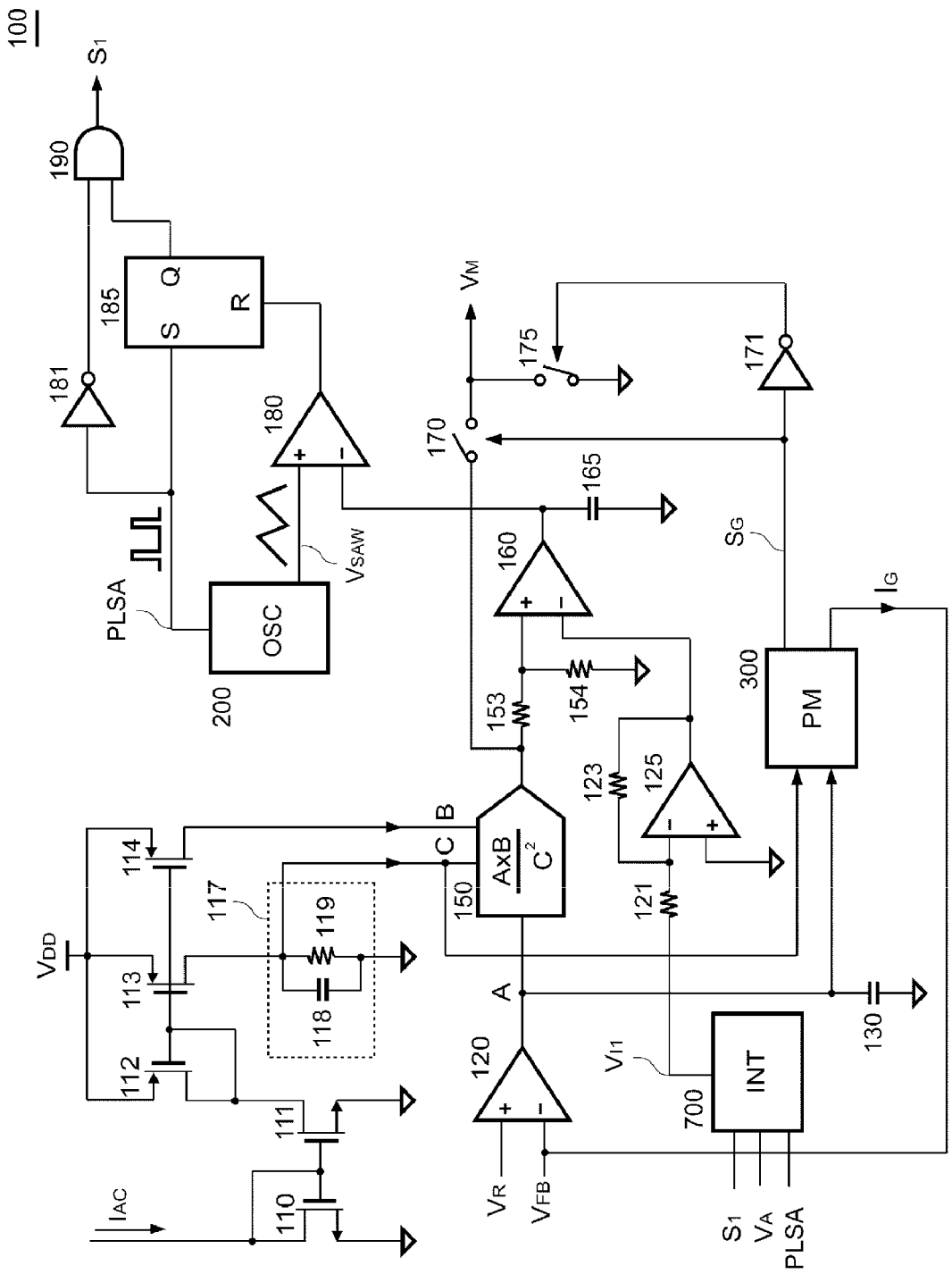
FIG. 7 is a circuit diagram illustrating another embodiment of the master control circuit according to the present invention.

FIG. 7 is a circuit diagram illustrating another embodiment of the master control circuit 100 according to the present invention. As shown, most of the circuits of the master control circuit 100 of this embodiment are the same as the first embodiment (as shown in FIG. 2) and no more description here, the main difference compared to the first embodiment is that the master control circuit 100 of this embodiment further comprises an integration circuit 700. The oscillator 200 generates the first pulse signal PLSA and the saw-tooth signal $V_{SAW}$. The integration circuit 700 generates a first-integrated signal $V_{I1}$ in response to the first switching signal $S_1$, the first-current signal $V_A$ and the first pulse signal PLSA. The first-integrated signal $V_{I1}$ is coupled to the negative input of the current amplifier 160 through the inverter amplifier formed by the amplifier 125 and the resistors 121 and 123 to generate the error signal with the multiplier signal $V_M$. The PWM circuit generates the first switching signal $S_1$ in response to the error signal, the first pulse signal PLSA and the saw-tooth signal $V_{SAW}$.

Figure 8:
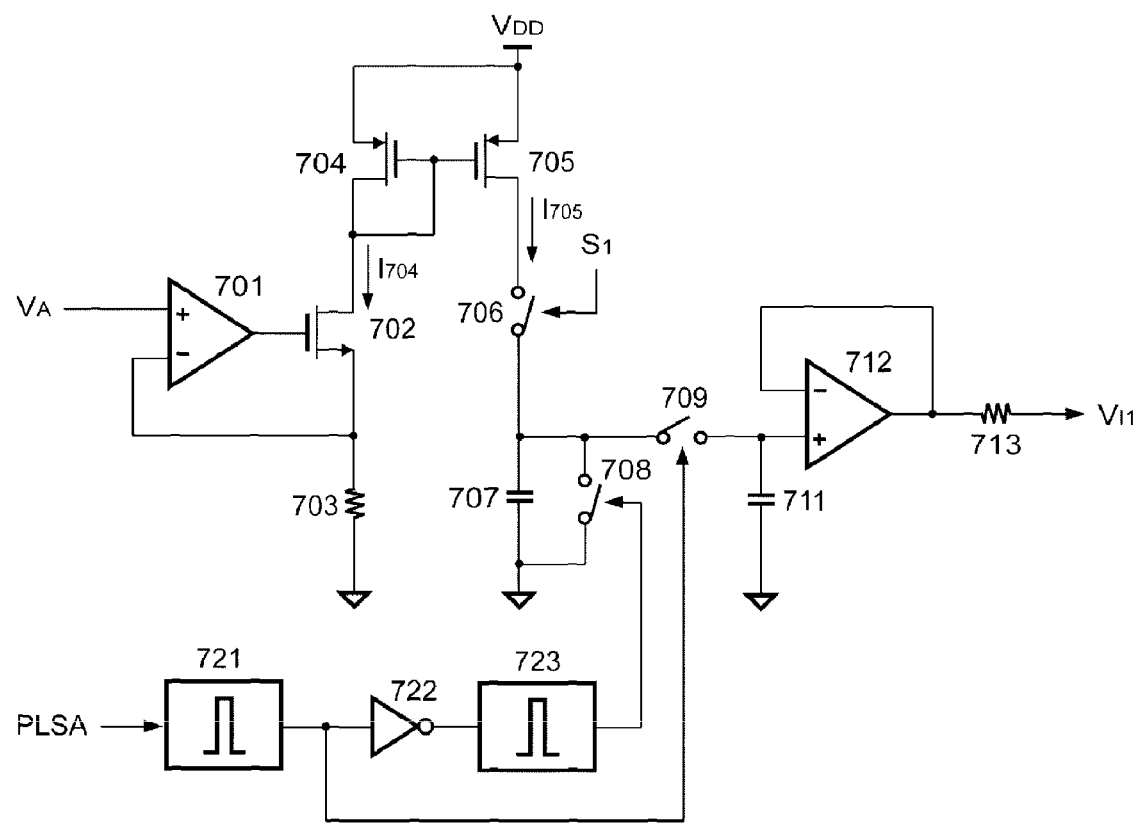
FIG. 8 is a circuit diagram illustrating one embodiment of the integration circuit of the master control circuit according to the present invention.

FIG. 8 is a circuit diagram illustrating an embodiment of the integration circuit 700 of the master control circuit 100 according to the present invention. The integration circuit 700 generates the first-integrated signal $V_{I1}$ in response to the first switching signal $S_1$, the first-current signal $V_A$ and the first pulse signal PLSA. The integration circuit 700 includes a V-to-I converter, a current mirror, a first switch 706, a capacitor 707, a second switch 708, a third switch 709, a hold capacitor 711, an amplifier 712, a resistor 713, a first pulse generator 721, an inverter 722 and a second pulse generator 723. The V-to-I converter formed by an amplifier 701, a resistor 703 and a transistor 702 generates a current $I_{704}$ at a drain of the transistor 702 through the resistor 703 in response to the first-current signal $V_A$. A positive input of the amplifier 701 receives the first-current signal $V_A$, and a negative input of the amplifier 701 is coupled to a source of the transistor 702. An output of the amplifier 701 is coupled to a gate of the transistor 702. The resistor 703 is coupled from the source of the transistor 702 to the ground.

The current mirror formed by a transistor 704 and a transistor 705 generates a current $I_{705}$ at a drain of the transistor 705 in accordance with the current $I_{704}$. A drain of the transistor 704 is coupled to the drain of the transistor 702 and gates of the transistors 704 and 705. Sources of the transistors 704 and 705 are coupled to the supply voltage $V_{DD}$. One terminal of the first switch 706 is coupled to the current mirror for receiving the current $I_{705}$. The other terminal of the first switch 706 is coupled to one terminal of the capacitor 707 and one terminal of the third switch 709. The other terminal of the capacitor 707 is coupled to the ground. The first switch 706 is controlled by the first switching signal S1. The second switch 708 is coupled to the capacitor 707 in parallel. The capacitor 707 is charged by the current $I_{705}$ correlated to the first-current signal $V_A$ to sample the first-current signal $V_A$. The capacitor 707 is discharged through the second switch 708.

One terminal of the hold capacitor 711 is coupled to the other terminal of the third switch 709 and a positive input of the amplifier 712. The other terminal of the hold capacitor 711 is coupled to the ground. The hold capacitor 711 is used to hold an output signal at the capacitor 707 through the third switch 709. A negative input of the amplifier 712 is coupled to an output of the amplifier 712. The output of the amplifier 712 generates the first-integrated signal $V_{I1}$ through the resistor 713. The amplifier 712 serves as a buffer. An input of the first pulse generator 721 receives the first pulse signal PLSA. The third switch 709 is controlled by an output of the first pulse generator 721. An input of the second pulse generator 723 is coupled to the output of the first pulse generator 721 through the inverter 722. The second switch 708 is controlled by an output of the second pulse generator 723.

Figure 9:
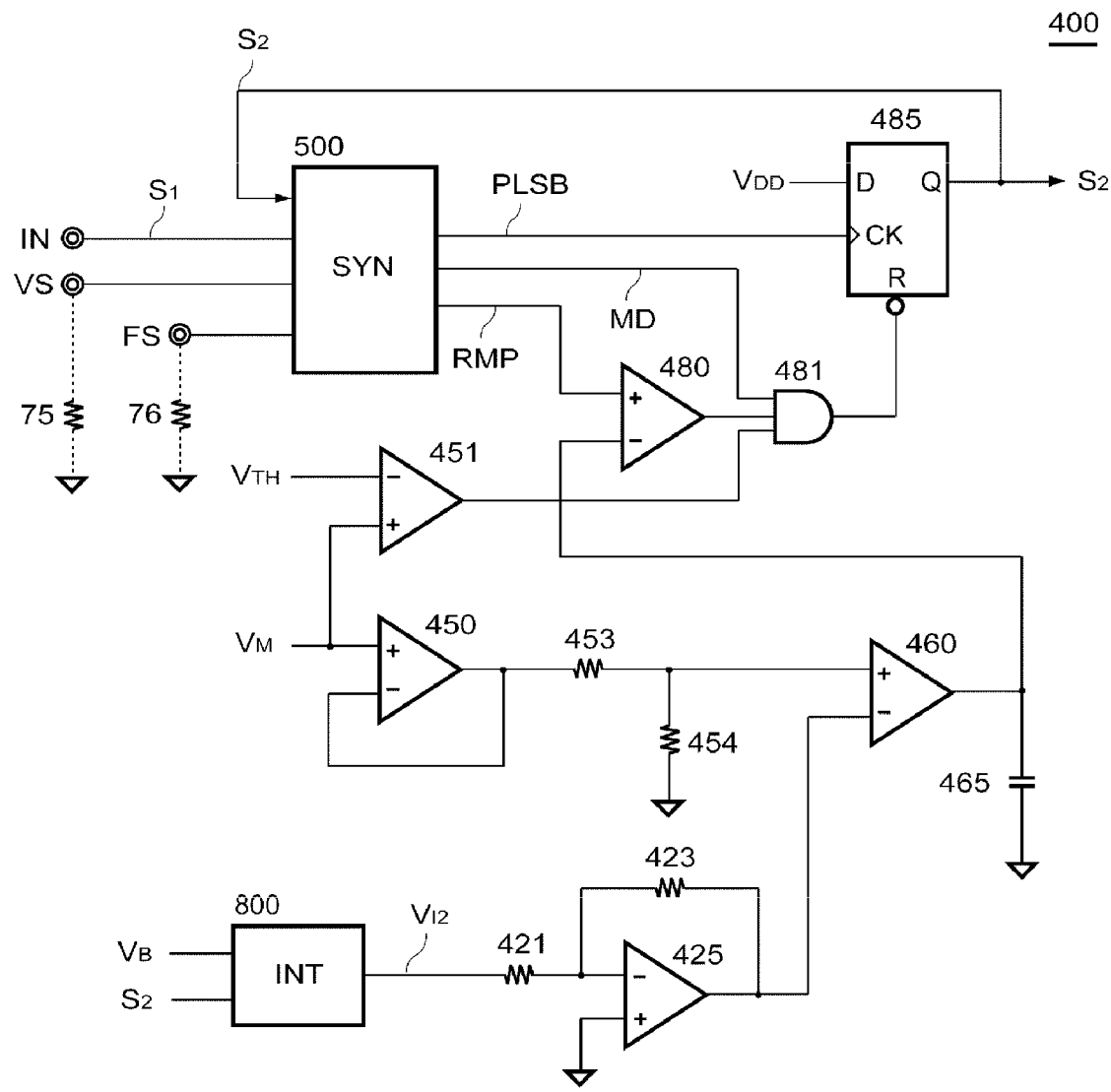
FIG. 9 is a circuit diagram illustrating another embodiment of the slave control circuit according to the present invention.

FIG. 9 is a circuit diagram illustrating another embodiment of the slave control circuit 400 according to the present invention. As shown, most of the circuits of the slave control circuit 400 of this embodiment are the same as the first embodiment (as shown in FIG. 4) and no more description here, the main difference compared to the first embodiment is that the slave control circuit 400 of this embodiment further comprises an integration circuit 800. The clock input CK of the D flip-flop 485 receives the second pulse signal PLSB generated by the synchronous circuit 500 to enable the second switching signal $S_2$ in response to the first switching signal $S_1$. The integration circuit 800 generates a second-integrated signal $V_{I2}$ in response to the second switching signal $S_2$ and the second-current signal $V_B$. The second-integrated signal $V_{I2}$ is coupled to the negative input of the current amplifier 460 through the inverter amplifier formed by the amplifier 425 and the resistors 421 and 423 to generate the error signal with the multiplier signal $V_M$. The PWM circuit generates the second switching signal $S_2$ in response to the error signal, the second pulse signal PLSB and the ramp signal RMP.

Figure 10:
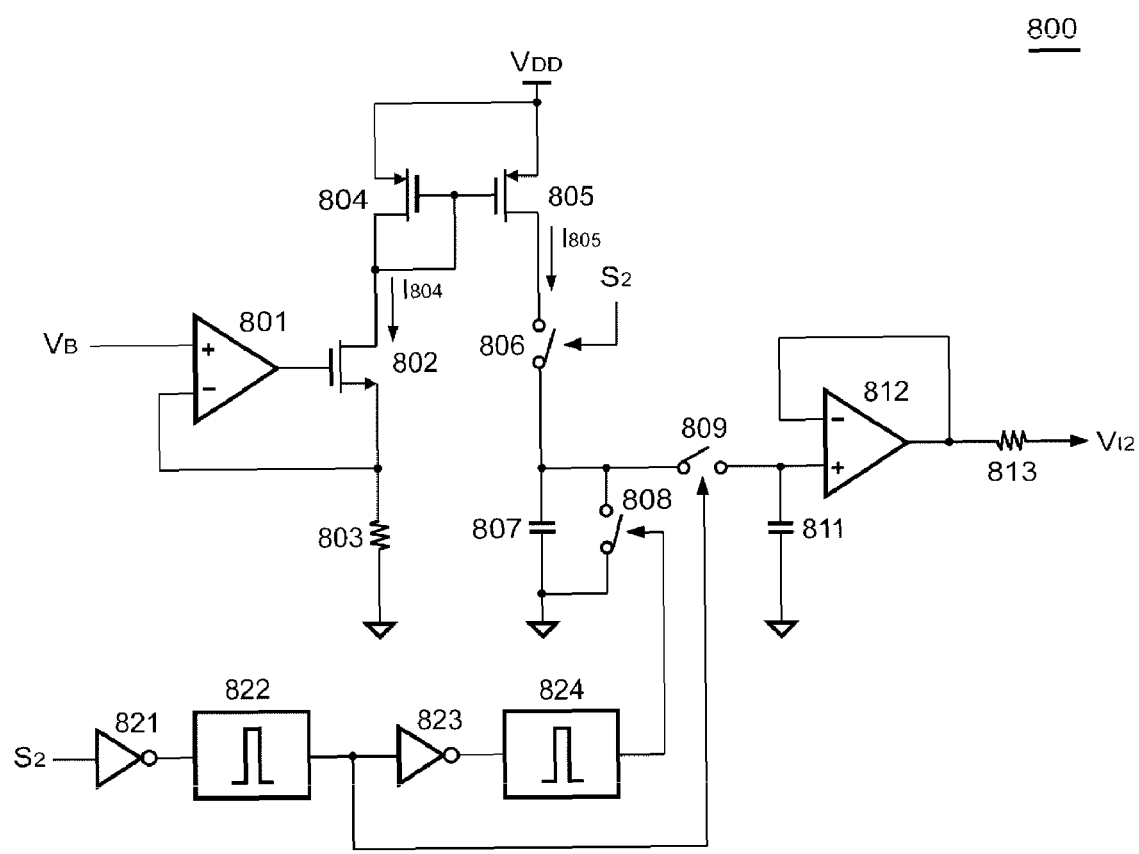
FIG. 10 is a circuit diagram illustrating one embodiment of the integration circuit of the slave control circuit according to the present invention.

FIG. 10 is a circuit diagram illustrating an embodiment of the integration circuit 800 of the slave control circuit 400 according to the present invention. The integration circuit 800 generates the second-integrated signal $V_{I2}$ in response to the second switching signal $S_2$ and the second-current signal $V_B$. The integration circuit 800 includes a V-to-I converter, a current mirror, a first switch 806, a capacitor 807, a second switch 808, a third switch 809, a hold capacitor 811, an amplifier 812, a resistor 813, an inverter 821, a first pulse generator 822, an inverter 823 and a second pulse generator 824. The V-to-I converter formed by an amplifier 801, a resistor 803 and a transistor 802 generates a current $I_{804}$ at a drain of the transistor 802 through the resistor 803 in response to the second-current signal $V_B$. A positive input of the amplifier 801 receives the second-current signal $V_B$, and a negative input of the amplifier 801 is coupled to a source of the transistor 802. An output of the amplifier 801 is coupled to a gate of the transistor 802. The resistor 803 is coupled from the source of the transistor 802 to the ground.

The current mirror formed by a transistor 804 and a transistor 805 generates a current $I_{805}$ at a drain of the transistor 805 in accordance with the current $I_{804}$. A drain of the transistor 804 is coupled to the drain of the transistor 802 and gates of the transistors 804 and 805. The supply voltage $V_{DD}$ is supplied to sources of the transistors 804 and 805. One terminal of the first switch 806 is coupled to the current mirror for receiving the current $I_{805}$. The capacitor 807 is coupled between the other terminal of the first switch 806 and the ground. The first switch 806 is controlled by the second switching signal $S_2$. The second switch 808 is coupled to the capacitor 807 in parallel. The capacitor 807 is charged by the current $I_{805}$ correlated to the second-current signal $V_B$ to sample the second-current signal $V_B$. The capacitor 807 is discharged through the second switch 808.

One terminal of the third switch 809 is coupled to the capacitor 807. One terminal of the hold capacitor 811 is coupled to the other terminal of the third switch 809 and a positive input of the amplifier 812. The other terminal of the hold capacitor 811 is coupled to the ground. The hold capacitor 811 is used to hold an output signal at the capacitor 807 through the third switch 809. A negative input of the amplifier 812 is coupled to an output of the amplifier 812. The output of the amplifier 812 generates the second-integrated signal $V_{I2}$ through the resistor 813. The amplifier 812 serves as a buffer. An input of the first pulse generator 822 receives the second switching signal $S_2$ through the inverter 821. An output of the first pulse generator 822 is utilized to control the third switch 809. An input of the second pulse generator 824 is coupled to the output of the first pulse generator 822 through the inverter 823. An output of the second pulse generator 824 is utilized to control the second switch 808.

What is claimed is:

1. A switching control circuit for multi-channels and multi-phases power converter comprising:
    a master control circuit coupled to an input and an output of the power converter and a first current-sense device to receive a line-input signal, a feedback signal and a first-current signal respectively, the feedback signal correlated to an output voltage of the power converter, the master control circuit generating a multiplier signal in response to the line-input signal and the feedback signal, and generating a first switching signal to switch a first inductor of the power converter in accordance with the multiplier signal and the first-current signal, wherein the first-current signal is correlated to a switching current of the first inductor; and
    a slave control circuit coupled to the master control circuit and a second current-sense device to receive the multiplier signal, the first switching signal and a second-current signal respectively, the slave control circuit generating a second switching signal to switch a second inductor of the power converter in accordance with the multiplier signal, the first switching signal and the second-current signal, wherein the second-current signal is correlated to a switching current of the second inductor.

2. The switching control circuit as claimed in claim 1, wherein the second switching signal is synchronized with the first switching signal.

3. The switching control circuit as claimed in claim 1, further comprising a programmable device connected to the slave control circuit to determine a delay time between the first switching signal and the second switching signal.

4. The switching control circuit as claimed in claim 1, wherein the master control circuit comprises a power management circuit to enable/disable the multiplier signal in accordance with the feedback signal, the multiplier signal is disabled when the feedback signal is lower than a light-load threshold.

5. The switching control circuit as claimed in claim 4, wherein the power management circuit further controls the on/off of the multiplier signal in accordance with the line-input signal, the increase of the line-input signal will decrease the level of the light-load threshold.

6. The switching control circuit as claimed in claim 4, wherein the power management circuit further generates a current signal coupled to the feedback signal when the multiplier signal is disabled, the current signal produces a hysteresis for turning on/off the multiplier signal.

7. The switching control circuit as claimed in claim 1, wherein the master control circuit comprises a multiplier-divider circuit for generating the multiplier signal in response to the line-input signal and the feedback signal.

8. The switching control circuit as claimed in claim 1, wherein the master control circuit comprises an oscillator and a PWM circuit, the oscillator generates a pulse signal and a saw-tooth signal, the PWM circuit generates the first switching signal in response to the multiplier signal, the first-current signal, the pulse signal and the saw-tooth signal.

9. The switching control circuit as claimed in claim 1, wherein the slave control circuit comprises a synchronous circuit for generating a pulse signal and a maximum-duty signal in response to the first switching signal and the second switching signal, the pulse signal is coupled to enable the second switching signal, the maximum-duty signal is coupled to determine a maximum duty of the second switching signal.

10. The switching control circuit as claimed in claim 9, wherein the synchronous circuit comprises a reset circuit to determine a pulse-width of the pulse signal.

11. The switching control circuit as claimed in claim 9, wherein the slave control circuit further comprises a current control unit and a PWM circuit, the current control unit generates an error signal in response to the multiplier signal and the second-current signal, the PWM circuit generates the second switching signal in response to the pulse signal, the error signal and a ramp signal.

12. The switching control circuit as claimed in claim 9, wherein the synchronous circuit generates a ramp signal in response to the second switching signal, the ramp signal is associated with the multiplier signal to determine a pulse width of the second switching signal.

13. The switching control circuit as claimed in claim 12, wherein a slope of the ramp signal is programmed by a resistor.

14. A switching control circuit for multi-channels and multi-phases power converter comprising:
- a master control circuit coupled to a first current-sense device to receive a first-current signal, the master control circuit generating a multiplier signal in response to an input voltage and an output voltage of the power converter, and generating a first switching signal to switch a first inductor of the power converter in accordance with the multiplier signal and the first-current signal; and
- a slave control circuit coupled to the master control circuit and a second current-sense device to receive the multiplier signal, the first switching signal and a second-current signal respectively, the slave control circuit generating a second switching signal to switch a second inductor of the power converter in accordance with the multiplier signal, the first switching signal and the second-current signal.

15. The switching control circuit as claimed in claim 14, wherein the first-current signal and the second-current signal are correlated to a switching current of a first power switch and a switching current of a second power switch respectively, the first power switch is coupled to the first inductor to switch the first inductor in response to the first switching signal, the second power switch is coupled to the second inductor to switch the second inductor in response to the second switching signal.

16. The switching control circuit as claimed in claim 14, wherein the second switching signal is synchronized with the first switching signal.

17. The switching control circuit as claimed in claim 14, further comprising a programmable device connected to the slave control circuit to determine a delay time between the first switching signal and the second switching signal.

18. The switching control circuit as claimed in claim 14, wherein the master control circuit receives a line-input signal and a feedback signal to generate the multiplier signal, the line-input signal and the feedback signal are correlated to the input voltage and the output voltage respectively.

19. The switching control circuit as claimed in claim 18, wherein the master control circuit comprises a power management circuit to enable/disable the multiplier signal in accordance with the feedback signal, the multiplier signal is disabled when the feedback signal is lower than a light-load threshold.

20. The switching control circuit as claimed in claim 19, wherein the power management circuit further controls the on/off of the multiplier signal in accordance with the line-input signal, the increase of the line-input signal will decrease the level of the light-load threshold.

21. The switching control circuit as claimed in claim 19, wherein the power management circuit further generates a current signal coupled to the feedback signal when the multiplier signal is disabled, the current signal produces a hysteresis for turning on/off the multiplier signal.

22. The switching control circuit as claimed in claim 14, wherein the master control circuit comprises an integration circuit for generating an integrated signal in response to the first switching signal, the first-current signal and a pulse signal, the master control circuit generates the first switching signal in response to the integrated signal and the multiplier signal.

23. The switching control circuit as claimed in claim 22, wherein the master control circuit further comprises an oscillator and a PWM circuit, the oscillator generates the pulse signal and a saw-tooth signal, the PWM circuit generates the first switching signal in response to the multiplier signal, the integrated signal, the pulse signal and the saw-tooth signal.

24. The switching control circuit as claimed in claim 14, wherein the master control circuit comprises a multiplier-divider circuit for generating the multiplier signal in response to the input voltage and the output voltage.

25. The switching control circuit as claimed in claim 14, wherein the slave control circuit comprises an integration circuit for generating an integrated signal in response to the second switching signal and the second-current signal, the slave control circuit generates the second switching signal in response to the integrated signal, the multiplier signal and the first switching signal.

26. The switching control circuit as claimed in claim 14, wherein the slave control circuit comprises a synchronous circuit for generating a pulse signal and a maximum-duty signal in response to the first switching signal and the second switching signal, the pulse signal is coupled to enable the second switching signal, the maximum-duty signal is coupled to determine a maximum duty of the second switching signal.

* * * * *